April 14, 1953 G. C. COX 2,635,077
ELECTRODE FOR THE ELECTROLYSIS OF SEAPORT AND RELATED WATERS
Filed April 11, 1949

Inventor
George Chandler Cox

By Harry M. Saragovitz
ATTORNEY

Patented Apr. 14, 1953

2,635,077

UNITED STATES PATENT OFFICE 2,635,077

ELECTRODE FOR THE ELECTROLYSIS OF SEAPORT AND RELATED WATERS

George Chandler Cox, Charleston, W. Va.

Original application March 24, 1944, Serial No. 527,986. Divided and this application April 11, 1949, Serial No. 86,832

2 Claims. (Cl. 204—224)

(Granted under Title 35, U. S. Code (1952), sec. 266)

The invention described herein, if patented, may be manufactured and used by or for the Government for governmental purposes without the payment of any royalty thereon.

This application is a division of my copending application Serial No. 527,986, filed March 24, 1944, now Patent No. 2,481,827.

An object of my invention is to provide an improved electrode assembly such that the electrical connection between the electrodes and the cable for supplying electricity thereto is shielded and screened from excessive electrolytic action.

A further object of this invention is to provide a shield of low conductivity material partially surrounding the cable terminal connection to the electrodes, whereby to reduce electrolytic corrosion of the terminal.

The apparatus shown herein has been found to give very useful results with one or more of the various processes claimed in my United States Patent No. 2,200,469 of May 14, 1940.

In this application brackish water is defined as water which contains chloride ions of any of the inland tidal ports handling ocean or coastwise marine traffic.

The electrode assembly herein disclosed is of general utility in a wide variety of electrolytes, and is especially adapted for use in open sea or sea port water, or in brackish water as above defined, or any water containing a sufficient amount of calcium and magnesium ions to enable carrying out of any of the coating processes set forth in my United States Patent No. 2,200,469.

Figure 1:
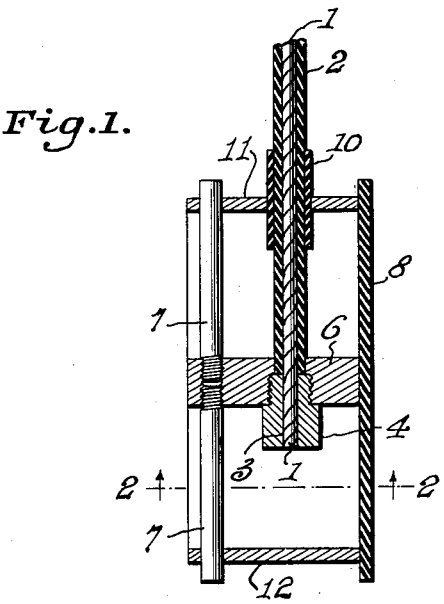
Figure 1 is a sectional side view of the apparatus.
Figure 2:
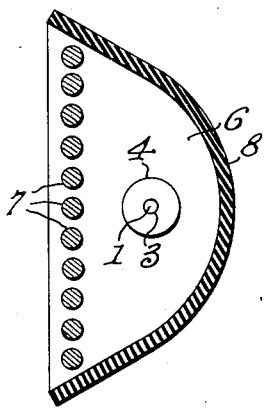
Figure 2 is a section along the line 2—2 of Figure 1, and shows a view of the apparatus transverse to that shown in Figure 1.

Reference numeral 1 represents an electrical cable to be connected to the electrode assembly herein described. This assembly forms one electrode of the electrolytic apparatus. The surface or object to be treated, such as the metal hull of a ship, forms the other electrode of the system. A suitable source of electricity is connected to the surface to be treated and to cable 1 for causing an electrolytic current to flow between the first-mentioned electrode and the surface to be treated. Cable 1 is protected by a covering 2 made of insulating material, preferably waterproof. A covering 10, such as a short piece of rubber hose, may be provided to prevent wearing away of the cable insulation 2, as well as to prevent flexing of the cable wires where the cable extends through the upper spacer plate 11 of the two spacer plates 11 and 12.

Cable 1 is soldered, brazed, or otherwise fixedly connected, mechanically and electrically, at 3 to terminal block 4.

Terminal block 4 is here shown as substantially cylindrical, with a reduced neck portion having external threads, and a central bore for receiving cable 1. Terminal block 4 is of material having good electrical conductivity.

Terminal block 4 is threadedly received in a current distributing plate 6, also preferably of material having good electrical conductivity. The threaded connection is especially desirable when either or both the terminal block and the distributing plate are of non-metallic materials, such as graphite or magnetite. The precise threaded connection between block 4 and plate 6 may be replaced by any suitable connection, provided good electrical contact is maintained. For example, the tapered plug and block connection shown in Figure 4 of my co-pending application Serial No. 527,986, now Patent No. 2,481,827, may be substituted within the scope of this invention. It is preferred that there be a mechanically separable connection between the cable terminal block and the current distributing plate. However, in some instances it may be desirable to fixedly attach the terminal block and current distributing plate together or to eliminate the terminal block and secure the cable directly to the current distributing plate, as by soldering or welding.

A plurality of electrode rods 7 are secured to the current distributing plate 6 adjacent at least one peripheral edge thereof. The vertical threaded connection between upper and lower electrodes 7 and distributing plate 6 is especially desirable when either the electrodes or the plate are of non-metallic material, as magnetite or graphite. This detachable connection is particularly convenient for replacement of worn out or broken electrodes. The electrodes may be attached in any other suitable manner to the distributing plate, and this invention is not to be limited to the specific threaded connection.

The outer edge of current distributing plate 6 is substantially surrounded by a transversely extending wall 8 at all portions except those bordered by electrodes 7. This wall 8 is formed of dielectric material or of material having considerably lower conductivity than the electrolyte in which the electrode assembly is to be used. Wall 8 thus forms an electrical shield which tends to repel electrolytic current dissipated from electrodes 7 and cause such current to flow away from the entire electrode assembly and toward the surface to be treated. Also, shield 8 forms an open circuit in the electrical circuit which includes cable 1, terminal block 4, and distributing plate 6. Input current fed to plate 6 tends to flow toward dissipating electrodes 7 and away from shield 8. Shield 8 thus increases the overall efficiency of the electrode assembly by effecting maximum useful electrolytic current from a given input current. Also, the shield acts to safeguard the input cable terminal connection to the electrodes by directing electrolytic current away from this connection.

By the positioning of electrodes 7 adjacent each other the lines of electrolytic current distribution which flow laterally from each electrode, or toward adjacent electrodes, crowd each other and tend to flow outwardly. This coaction between the electrodes tends to reduce electrolytic current flowing inward toward the cable terminal. Thus, the mutual effect of the electrodes is a screening action which protects the cable terminal from excessive electrolytic current and consequent deterioration.

It is not intended to limit this invention to cylindrical elongated electrodes, since a variety of cross-sectional shapes of the electrodes other than circular may be employed.

While a specific embodiment has been illustrated herein, considerable deviation from the illustrated structure may be resorted to within the scope of this invention.

Having thus described a specific embodiment of my invention with sufficient particularity to enable one skilled in the art to construct and use the same.

What is claimed is:

1. An electrode assembly for electrolytic apparatus comprising an electrically conductive plate having a medial hole therethrough, an insulated lead-in cable extending through said hole and detachably connected, electrically and mechanically, to the lower face of said plate, a plurality of spaced electrode rods threadedly attached on the upper and lower faces of said plate adjacent a portion of the periphery thereof and extending substantially perpendicular to said plate, and a wall of high resistivity material which extends substantially perpendicular to said plate substantially co-extensive with the perpendicular extent of said rods, said wall being secured to said plate and surrounding the periphery thereof except that peripheral portion adjacent which the rods are attached.

2. An electrode assembly for electrolytic apparatus comprising, an electrically conductive plate having an opening therethrough, an insulated lead-in cable extending through said opening and detachably connected, electrically and mechanically, to the lower face of said plate, a plurality of spaced electrode rods on the upper and lower faces of said plate adjacent a portion of the periphery thereof and extending substantially perpendicular to said plate, and a wall of high resistivity material which extends substantially perpendicular to said plate substantially coextensively with the perpendicular extent of said rods, said wall being secured to said plate and surrounding the periphery thereof except that peripheral portion adjacent which the rods are attached.

GEORGE CHANDLER COX.

References Cited in the file of this patent

UNITED STATES PATENTS

| Number | Name | Date |
|---|---|---|
| 501,996 | Emmens | July 25, 1893 |
| 1,073,559 | Allen | Sept. 16, 1913 |
| 2,256,820 | Veale | Sept. 23, 1941 |

FOREIGN PATENTS

| Number | Country | Date |
|---|---|---|
| 15,264 | Great Britain | Aug. 10, 1893 |
| 121,460 | Great Britain | June 19, 1919 |
| 204,781 | Great Britain | Oct. 8, 1923 |
| 763,863 | France | Feb. 19, 1934 |